United States Patent
Kenney (10) Patent No.: US 10,670,077 B2
(45) Date of Patent: Jun. 2, 2020

(54) SEALED BEARING ASSEMBLY AND METHOD OF FORMING SAME

(71) Applicant: General Electric Company, Schenectady, NY (US)

(72) Inventor: Thomas Bradley Kenney, Ashby, MA (US)

(73) Assignee: General Electric Company, Schenectady, NY (US)

( * ) Notice: Subject to any disclaimer, the term of this patent is extended or adjusted under 35 U.S.C. 154(b) by 303 days.

(21) Appl. No.: 15/585,923

(22) Filed: May 3, 2017

(65) Prior Publication Data
US 2018/0320550 A1 Nov. 8, 2018

(51) Int. Cl.
| F16C 33/66 | (2006.01) |
| F16C 33/76 | (2006.01) |
| F16C 33/78 | (2006.01) |
| F16C 43/04 | (2006.01) |
| F01D 25/16 | (2006.01) |
| F01D 25/18 | (2006.01) |

(52) U.S. Cl.
CPC .......... *F16C 33/6659* (2013.01); *F01D 25/16* (2013.01); *F01D 25/183* (2013.01); *F16C 33/768* (2013.01); *F16C 33/7886* (2013.01); *F16C 43/045* (2013.01); *F05D 2240/54* (2013.01); *F05D 2260/38* (2013.01); *F16C 2360/23* (2013.01)

(58) Field of Classification Search
CPC .... F16C 33/6659; F16C 33/768; F16C 33/78; F16C 33/7826; F16C 33/7886
USPC .......................................................... 384/466
See application file for complete search history.

(56) References Cited

U.S. PATENT DOCUMENTS

| 4,312,546 A * | 1/1982 | Bayer ...................... D07B 7/06 384/470 |
| 4,541,738 A * | 9/1985 | Leibensperger ...... F16C 19/364 184/31 |
| 5,498,085 A | 3/1996 | Kizer et al. |
| 6,837,317 B2 * | 1/2005 | Byrd ....................... E21B 10/25 175/371 |
| 7,040,811 B2 | 5/2006 | Dusserre-Telmon et al. |
| 7,384,197 B2 | 6/2008 | Plona |
| 8,083,469 B1 | 12/2011 | Pinera |
| 8,491,195 B2 * | 7/2013 | Kobayashi ........... B23Q 11/122 384/462 |
| 2015/0233293 A1 | 8/2015 | Grogg |
| 2016/0160994 A1 | 6/2016 | Venter |
| 2016/0169281 A1 | 6/2016 | Ertas et al. |
| 2016/0238075 A1 | 8/2016 | Clark et al. |
| 2016/0273386 A1 | 9/2016 | Sheridan et al. |

* cited by examiner

*Primary Examiner* — James Pilkington
(74) *Attorney, Agent, or Firm* — Dority & Manning, P.A.

(57) ABSTRACT

A sealed bearing assembly includes an inner race, a bearing element, and an outer race extending radially in axial alignment between a rotatable member having an axis of rotation and a stationary support structure. The sealed bearing assembly also includes a first inlet header coupled to a first axial end of the outer race. The first inlet header includes at least one oil inlet port, at least one oil nozzle, and a first sealing member extending between the first inlet header and a first surface of the inner race.

20 Claims, 6 Drawing Sheets

SEALED BEARING ASSEMBLY AND METHOD OF FORMING SAME

BACKGROUND

The present disclosure relates generally to bearing assemblies and, more specifically, to sealed bearing assemblies.

Gas turbine engines typically include a compressor, a combustor, and at least one turbine. The compressor may compress air, which may be mixed with fuel and channeled to the combustor. The mixture may then be ignited for generating hot combustion gases, and the combustion gases may be channeled to the turbine. The turbine may extract energy from the combustion gases for powering the compressor, as well as producing useful work to propel a craft (e.g., aircraft), such as by driving a fan or propeller, or to power a load, such as an electrical generator.

Rotating turbomachinery, such as that found in gas turbine engines, frequently contains one or more bearing assemblies to support rotating components within stationary housings or between or within other rotating apparatus. At least some known bearing assemblies are positioned within structural compartments known as "sumps," in which the bearing assembly is open to the entire sump cavity. The bearing is lubricated by spraying oil directly onto the bearing or onto an adjacent component that routes the oil into the bearing. The oil may drain away from the bearings into the sump cavity, which is sealed by a plurality of seals. These seals rely on a flow of air entering the sump to prevent oil from leaking out of the sump cavity. Due to the size and shape of the sumps, and speed of the bearings, the sump contains a frothy mixture of oil and air. These known bearing assemblies can be bulky and relatively heavy, and use large quantities of oil that must be stored, pumped, filtered, and cooled. Moreover, these bearing assemblies consume power through heat rejection into the oil and through air flow into the sump cavity.

BRIEF DESCRIPTION

In one aspect, a sealed bearing assembly is provided. The sealed bearing assembly includes an inner race, a bearing element, and an outer race extending radially in axial alignment between a rotatable member having an axis of rotation and a stationary support structure. The sealed bearing assembly also includes a first inlet header coupled to a first axial end of the outer race. The first inlet header includes at least one oil inlet port, at least one oil nozzle, and a first sealing member extending between the first inlet header and a first surface of the inner race.

In one aspect of the disclosure, which may include at least a portion of the subject matter of any of the preceding and/or following examples and aspects, a second inlet header is coupled to a second axial end of the outer race, the second inlet header including a second sealing member extending between the second inlet header and a second surface of the inner race.

In one aspect of the disclosure, which may include at least a portion of the subject matter of any of the preceding and/or following examples and aspects, the second sealing member extends axially between the second inlet header and the second surface of the inner race.

In one aspect of the disclosure, which may include at least a portion of the subject matter of any of the preceding and/or following examples and aspects, the second sealing member extends radially between the second inlet header and the second surface of the inner race.

In one aspect of the disclosure, which may include at least a portion of the subject matter of any of the preceding and/or following examples and aspects, the second inlet header includes at least one oil port and at least one oil nozzle.

In one aspect of the disclosure, which may include at least a portion of the subject matter of any of the preceding and/or following examples and aspects, the second sealing member includes a carbon material.

In one aspect of the disclosure, which may include at least a portion of the subject matter of any of the preceding and/or following examples and aspects, the bearing element includes a plurality of rolling elements and a bearing cage at least partially surrounding the plurality of rolling elements.

In one aspect of the disclosure, which may include at least a portion of the subject matter of any of the preceding and/or following examples and aspects, the first sealing member includes a carbon material.

In one aspect of the disclosure, which may include at least a portion of the subject matter of any of the preceding and/or following examples and aspects, the first sealing member extends axially between the first inlet header and a first surface of the inner race.

In one aspect of the disclosure, which may include at least a portion of the subject matter of any of the preceding and/or following examples and aspects, the first sealing member extends radially between the first inlet header and a first surface of the inner race.

In one aspect of the disclosure, which may include at least a portion of the subject matter of any of the preceding and/or following examples and aspects, at least one of the inner race, the outer race, and the first inlet header is formed of a sintered material.

In another aspect, a method of forming a sealed bearing assembly is provided. The method includes coupling an outer race to a stationary support structure, and coupling a first inlet header to a first axial end of the outer race, the first inlet header including at least one oil port and at least one oil nozzle. The method also includes coupling an inner race in axial alignment with the outer race to a rotatable member having an axis of rotation. The method further includes positioning a bearing element in axial alignment with the outer race and the inner race within a cavity defined between the outer race and the inner race, and positioning a first sealing member between the first inlet header and a first surface of the inner race to at least partially seal the cavity.

In one aspect of the disclosure, which may include at least a portion of the subject matter of any of the preceding and/or following examples and aspects, the method further includes coupling a second inlet header to a second axial end of the outer race, and positioning a second sealing member between the second inlet header and a second surface of the inner race to at least partially seal the cavity.

In one aspect of the disclosure, which may include at least a portion of the subject matter of any of the preceding and/or following examples and aspects, the method further includes forming at least one of the first inlet header and the second inlet header using additive manufacturing.

In one aspect of the disclosure, which may include at least a portion of the subject matter of any of the preceding and/or following examples and aspects, positioning the first sealing member between the first inlet header and a first surface of the inner race includes positioning the first sealing member such that the first sealing member extends axially between the first inlet header and the first surface of the inner race.

In one aspect of the disclosure, which may include at least a portion of the subject matter of any of the preceding and/or following examples and aspects, positioning the first sealing member between the first inlet header and a first surface of the inner race includes positioning the first sealing member such that the first sealing member extends radially between the first inlet header and the first surface of the inner race.

In a further aspect, a machine is provided. The machine includes a rotatable member having an axis of rotation, a stationary member radially spaced from the rotatable member, and a sealed bearing assembly positioned between the rotatable member and the stationary member to rotatably support the rotatable member in the machine. The sealed bearing assembly includes an inner race, a bearing element, and an outer race extending radially in axial alignment between the rotatable member and the stationary support structure. The sealed bearing assembly also includes a first inlet header coupled to a first axial end of the outer race. The first inlet header includes at least one oil inlet port, at least one oil nozzle, and a first sealing member extending between the first inlet header and a first surface of the inner race.

In one aspect of the disclosure, which may include at least a portion of the subject matter of any of the preceding and/or following examples and aspects, the sealed bearing assembly further includes a second inlet header coupled to a second axial end of the outer race, the second inlet header including a second sealing member extending between the second inlet header and a second surface of the inner race.

In one aspect of the disclosure, which may include at least a portion of the subject matter of any of the preceding and/or following examples and aspects, the bearing element includes a plurality of rolling elements and a bearing cage at least partially surrounding the plurality of rolling elements.

In one aspect of the disclosure, which may include at least a portion of the subject matter of any of the preceding and/or following examples and aspects, at least one of the inner race, the outer race, and the first inlet header is formed of a sintered material.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of a machine. Moreover, the terms "radial" and "radially" refer to directions and orientations that extend substantially perpendicular to the centerline. In addition, as used herein, the terms "circumferential" and "circumferentially" refer to directions and orientations that extend arcuately about the centerline.

Embodiments of the present disclosure relate to sealed bearing assemblies, such as those found in gas turbine engines. More specifically, the sealed bearing assembly includes an inner race, a bearing element, and an outer race extending radially in axial alignment between a rotatable member having an axis of rotation and a stationary support structure. The sealed bearing assembly also includes inlet headers coupled to axial ends of the outer race. The inlet headers include at least one oil inlet port, at least one oil nozzle, and a sealing member extending between the corresponding inlet header and the inner race. The sealing members seal a cavity formed between the outer race and the inner race to keep oil within the cavity. The inlet headers are formed such that oil channeled through the oil nozzles into the cavity is highly localized. The sealed bearing assembly described herein facilitates reducing the amount of oil and air used to maintain lubrication and cooling of the bearing element. In turn, heat rejection and machine weight are reduced. In the particular implementation of the sealed bearing assembly in an aircraft turbine engine, by reducing weight of the engine and reducing oil consumption, specific fuel consumption (SFC) and operating cost may also be reduced (e.g., lower cost per hour of flight).

While the following embodiments are described in the context of a turbofan engine, it should be understood that the systems and methods described herein are also applicable to turboprop engines, turboshaft engines, turbojet engines, and ground-based turbine engines, for example. Moreover, the systems and method described herein are equally applicable to non-engine based machinery for which bearings between rotating and stationary components may be used.

Figure 1:
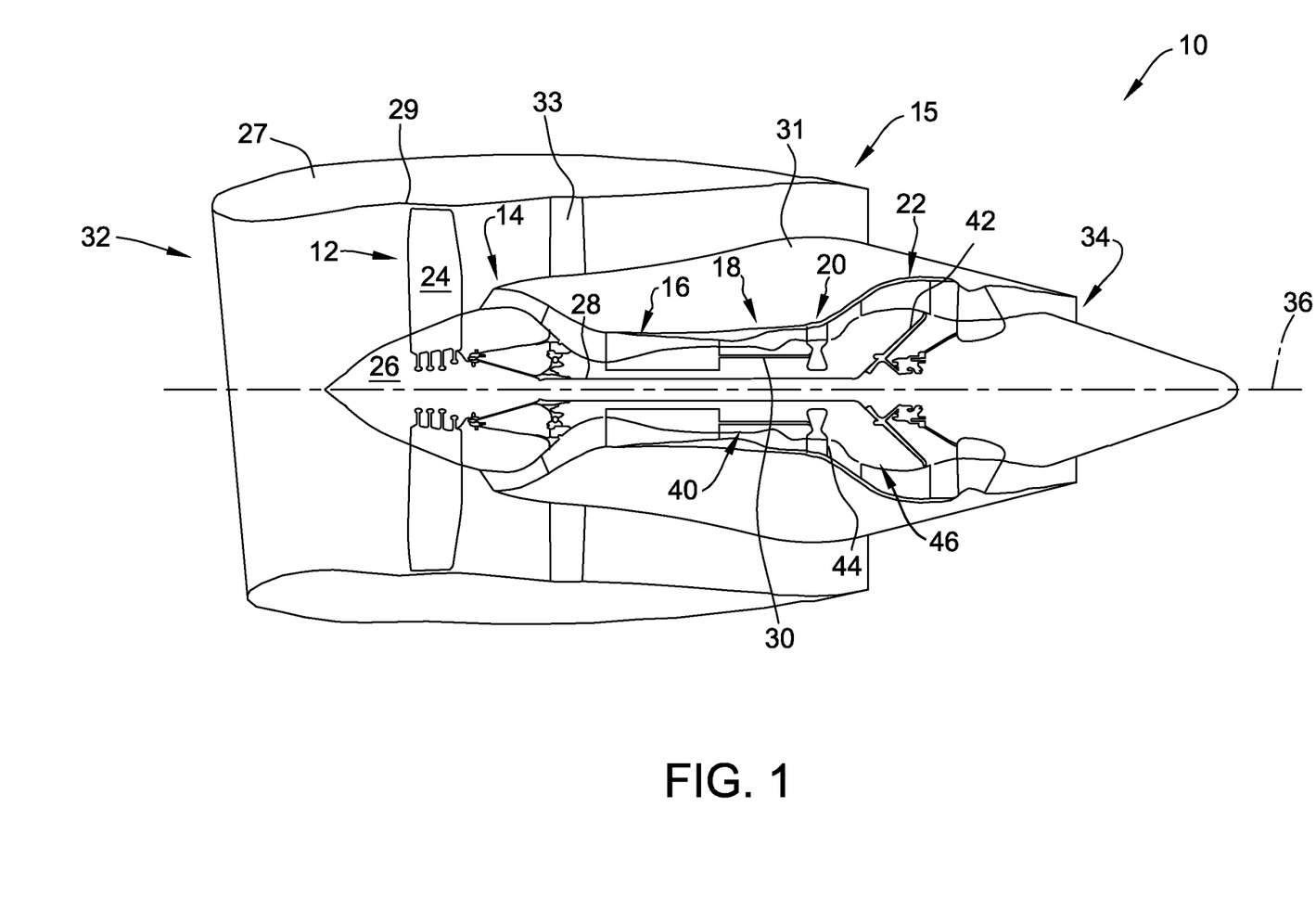
FIG. 1 is a schematic illustration of an exemplary machine embodied as a turbine engine.

FIG. 1 is a schematic diagram of an exemplary machine 10, which is embodied as an aircraft turbine engine 15. In other embodiments, machine 10 may be embodied as a non-engine machine, such as automobile machinery, energy machinery (e.g., land-based turbine engines), and/or any machinery having a bearing interface between rotating and stationary components. In the illustrated embodiment, turbine engine 15 includes a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 15 also includes a high-pressure turbine assembly 20 coupled in flow communication with combustor assembly 18 and a low-pressure turbine assembly 22. Fan assembly 12 includes an array of fan blades 24 extending radially outward from a rotor disk 26 toward a nacelle 27 that includes a fan case 29. A turbine case 31 extends circumferentially around low-pressure or booster compressor assembly 14, high-pressure compressor assembly 16, combustor assembly 18, high-pressure turbine assembly 20, and low-pressure turbine assembly 22. Turbine engine 15 also includes an outlet guide vane 33 positioned aft of fan assembly 12 and extending from turbine case 31 to fan case 29. Low-pressure turbine assembly 22 is coupled to fan assembly 12 and booster compressor assembly 14 through a first drive shaft 28, and high-pressure turbine assembly 20 is coupled to high-pressure compressor assembly 16 through a second drive shaft 30. In the example embodiment, first drive shaft 28 and/or second drive shaft 30 may be referred to more generally as a rotatable member 40. First drive shaft 28 is rotatably supported within turbine engine 15 by a first frame 42 spaced radially from first drive shaft 28 and a bearing assembly 100 (shown in FIG. 2). Similarly, second drive shaft 30 is rotatably supported within turbine engine 15 by a second frame 44 spaced radially from second drive shaft 30 and another bearing assembly 100 (shown in FIG. 2). In the example embodiment, first frame 42 and/or second frame 44 may be referred to more generally as a stationary member 46. In general, stationary member 46 is spaced radially from rotatable member 40, and a bearing assembly 100 is positioned therebetween to rotatably support rotatable member 40 within machine 10.

Turbine engine 15 has an intake 32 and an exhaust 34. Turbine engine 15 further includes a centerline or axis of rotation 36 about which fan assembly 12, booster compressor assembly 14, high-pressure compressor assembly 16, turbine assemblies 20 and 22, first drive shaft 28, and second drive shaft 30 rotate. In operation, air entering turbine engine 15 through intake 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbine engine 15 via exhaust 34.

Figure 2:
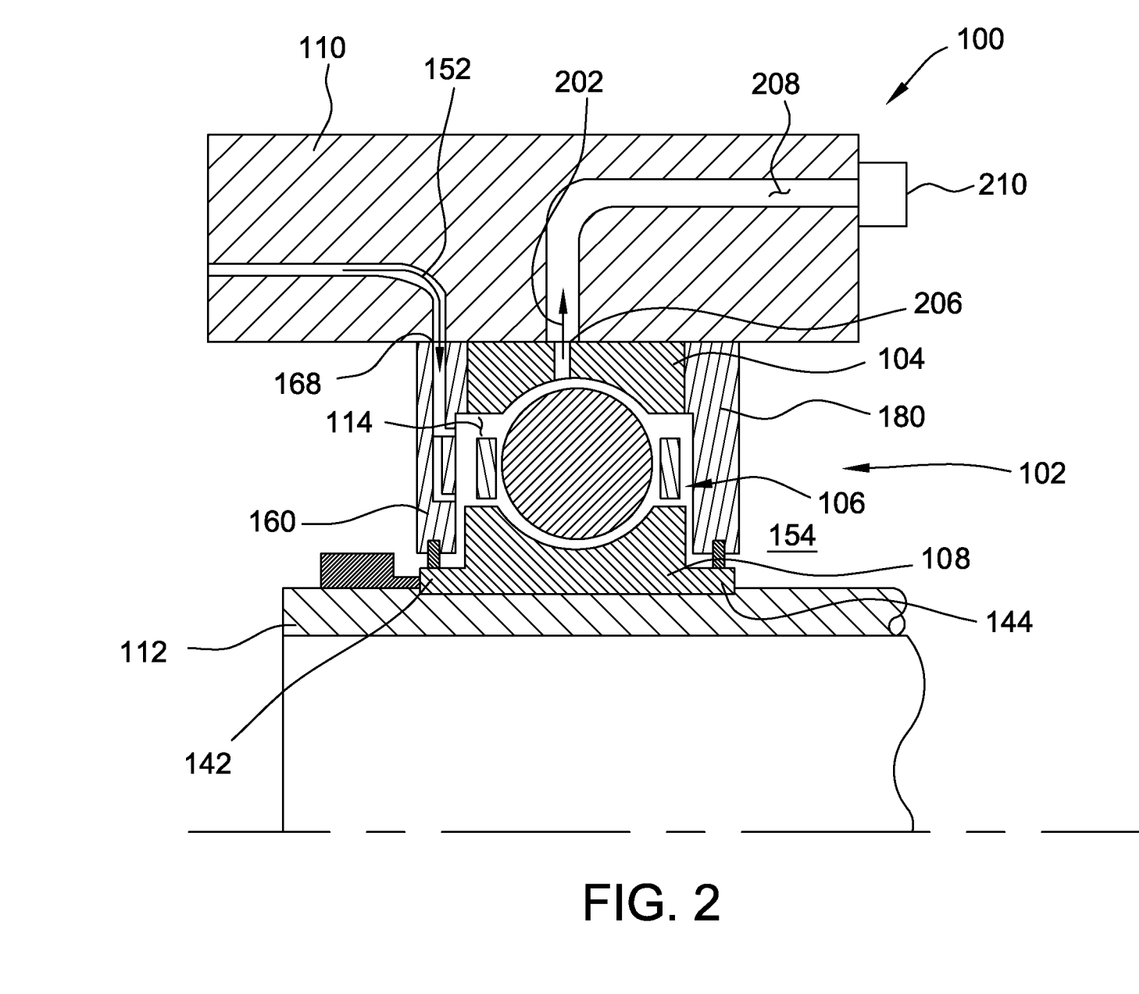
FIG. 2 is a cross-sectional view of an exemplary bearing assembly embodied as a sealed bearing assembly that may be used with the turbine engine shown in FIG. 1.

FIG. 2 is a cross-sectional view of an exemplary embodiment of bearing assembly 100. In the illustrated embodiment, bearing assembly 100 is embodied as a sealed bearing assembly 102. Sealed bearing assembly 102 includes an outer race 104, a bearing element 106, and an inner race 108. Outer race 104, bearing element 106, and inner race 108 extend radially in axial alignment between a stationary support structure 110, such as stationary member 46 of turbine engine 15 (shown in FIG. 1), and a rotatable member 112, such as rotatable member 40 of turbine engine 15 (shown in FIG. 1). For example, bearing assembly 100 may be positioned between first frame 42 and first drive shaft 28 or between second frame 44 and second drive shaft 30 of turbine engine 15 (all shown in FIG. 1). Outer race 104 and inner race 108 define a cavity 114 therebetween. Bearing element 106 is positioned within cavity 114 between outer race 104 and inner race 108.

Figure 3:
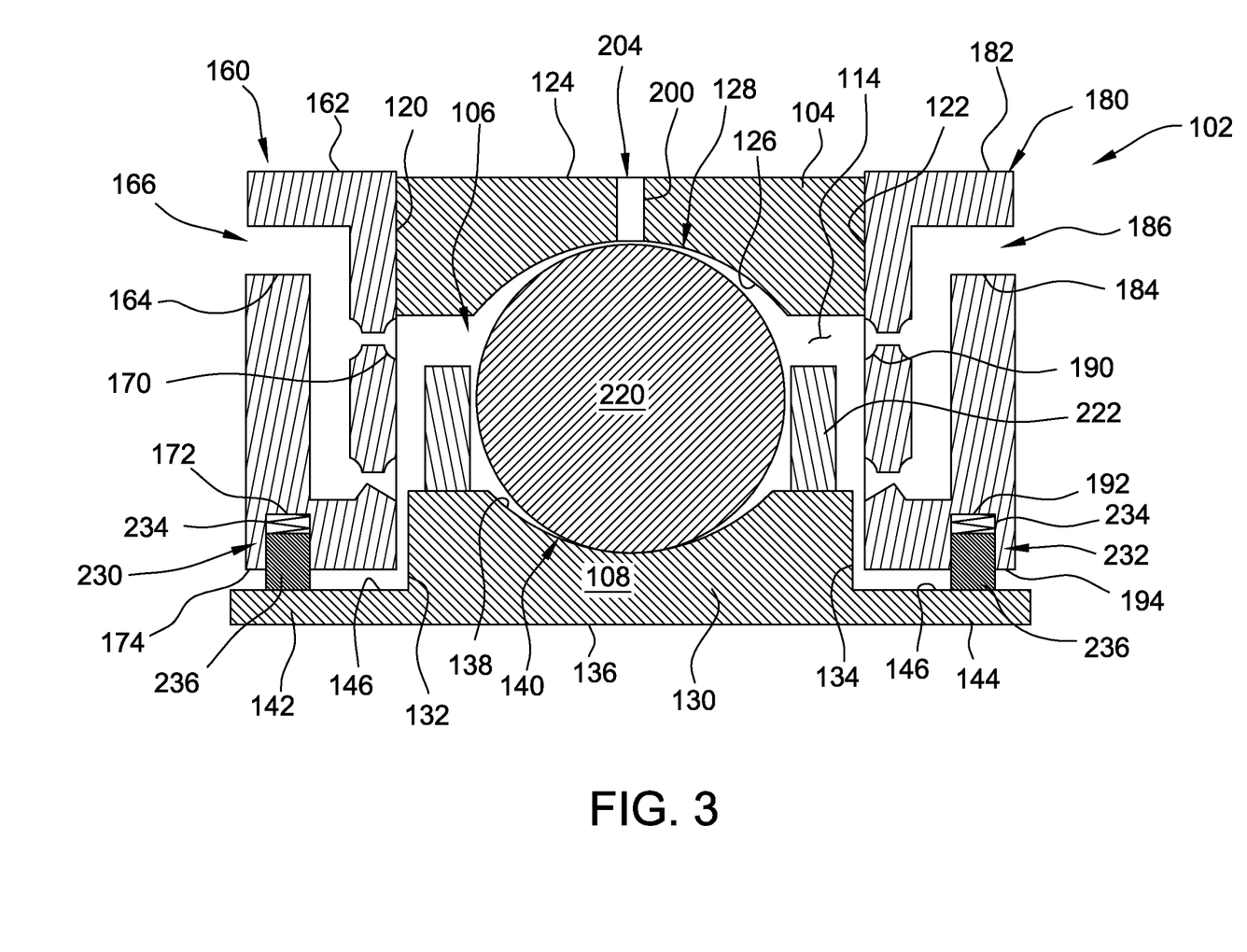
FIG. 3 is an enlarged view of the sealed bearing assembly shown in FIG. 2.
Figure 4:
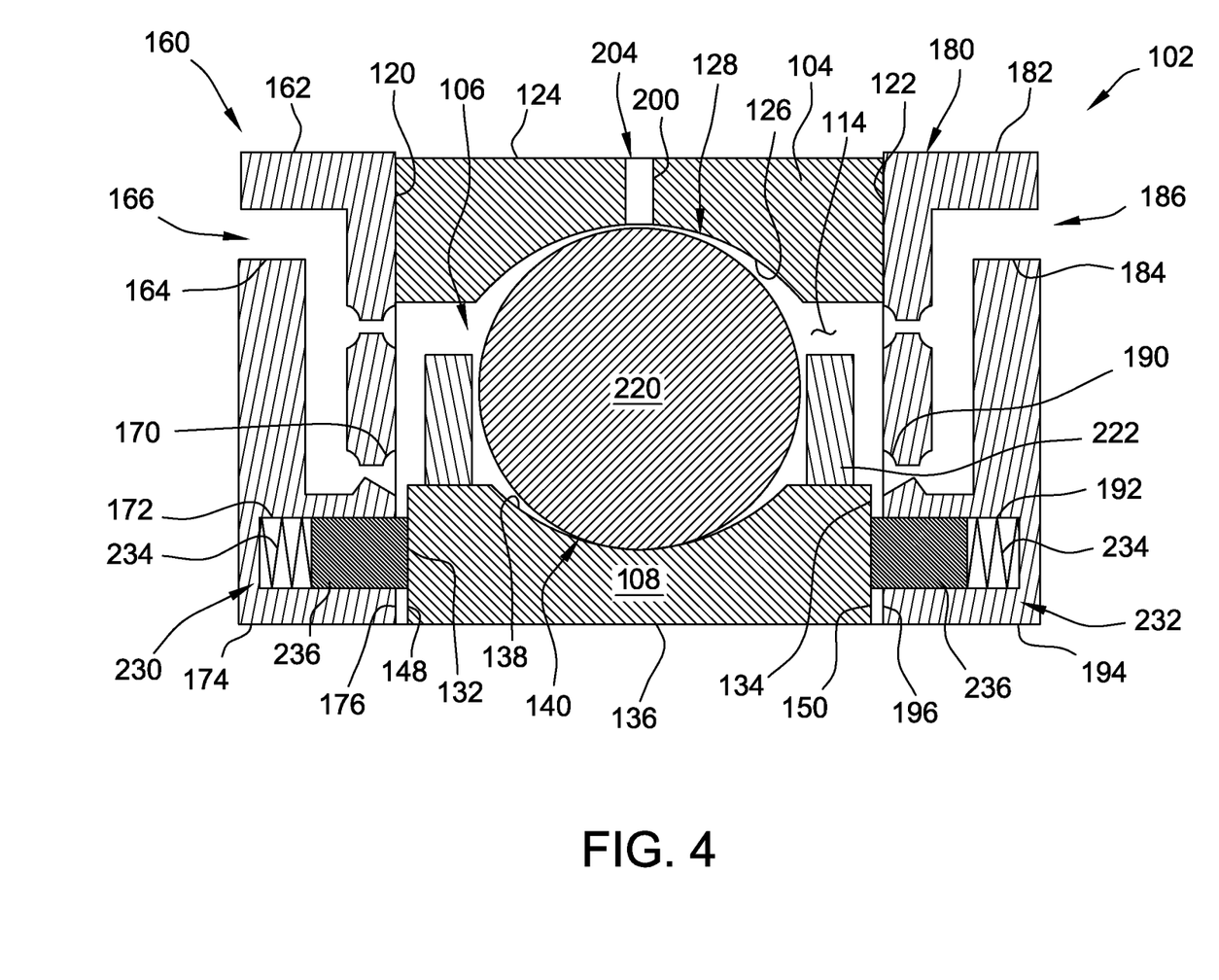
FIG. 4 is a view similar to FIG. 3 of another embodiment of a sealed bearing assembly.

FIGS. 3 and 4 are enlarged views of embodiments of sealed bearing assembly 102. With reference to FIGS. 2-4, outer race 104 is coupled to stationary support structure 110. In some embodiments, stationary support structure 110 includes a stationary member 46 such as a frame (e.g., first frame 42 or second frame 44). Stationary support structure 110 may alternatively include a stationary support structure coupled to a stationary member 46, such as a base coupled to a frame. In the example embodiment, outer race 104 is an annular outer race 104 and includes a first axial end 120 and a second axial end 122. Outer race 104 is coupled to stationary support structure 110 along a first surface 124 of outer race 104 that extends between first axial end 120 and second axial end 122. Outer race 104 further includes a concave groove 128 defined in a second surface 126 opposite first surface 124. Concave groove 128 facilitates keeping rolling elements 220 of bearing element 106 (described further herein) suitably positioned within cavity 114.

Inner race 108 is coupled to rotatable member 112 in axial alignment with outer race 104. In some embodiments, rotatable member 112 includes a rotating shaft (e.g., first or second drive shaft 28, 30). Rotatable member 112 rotates about axis of rotation 36 (shown in FIG. 1). In the example embodiment, inner race 108 is an annular inner race 108. Inner race 108 includes a body 130 that defines a first axial end 132 and a second axial end 134 of inner race 108. Inner race 108 is coupled to rotatable member 112 along a first surface 136 of inner race 108 that extends between first axial end 132 and second axial end 134. Body 130 includes a concave groove 140 defined in a second surface 138 opposite first surface 136. Concave groove 140 facilitates keeping rolling elements 220 of bearing element 106 (described further herein) suitably positioned within cavity 114. In some embodiments, inner race 108 further includes first and second axial arms 142, 144 (see FIGS. 2 and 3) extending respectively from first axial end 132 and second axial end 134. First and second axial arms 142, 144 define a third surface 146 of inner race 108. In other embodiments, inner race 108 does not include axial arms 142, 144 (see FIG. 4). In these embodiments, first axial end 132 defines a first end surface 148, and second axial end 134 defines a second end surface 150.

In some embodiments, at least one of outer race 104 and inner race 108 is fabricated from a sintered material using 3D printing and/or additive manufacturing techniques. In other embodiments, at least one of outer race 104 and/or inner race 108 is fabricated in any suitable fashion from any suitable material, such as a metal, ceramic, and/or composite material.

A first inlet header 160 is coupled to first axial end 120 of outer race 104, and a second inlet header 180 is coupled to second axial end 122 of outer race 104. First inlet header 160 and second inlet header 180 are further coupled to stationary support structure 110, for example, along a first surface 162 of first inlet header 160 and a first surface 182 of second inlet header 180. In the example embodiment, first inlet header 160 includes at least one oil inlet port 164 defined therein. Oil inlet port 164 channels oil 152 from an oil supply source into sealed bearing assembly 102, specifically into first inlet header 160. In the illustrated embodiment, first inlet header 160 includes a first port aperture 166 defined in first surface 162. First port aperture 166 is in fluid communication with an oil supply aperture 168 (see FIG. 2) defined in stationary support structure 110. First inlet header 160 may include a plurality of oil inlet ports 164 and a corresponding plurality of first port apertures 166 arranged circumferentially in first inlet header 160. In addition, first inlet header 160 includes at least one oil nozzle 170 defined therein. Oil nozzles 170 are in fluid communication with oil inlet port(s) 164. Oil nozzles 170 transmit oil 152 from oil inlet port 164 into cavity 114 (i.e., about bearing element 106). In one particular embodiment, first inlet header 160 is fabricated such that oil nozzles 170 transmit oil 152 into cavity 114 as a fine spray. For example, first inlet header 160 is formed of a sintered material using 3D printing and/or additive manufacturing techniques to include oil inlet port(s) 164 and oil nozzle(s) 170. Accordingly, first inlet header 160 can be formed to apply oil 152 in a controlled manner, in close proximity to those points of bearing element 106 most in need of lubrication and/or cooling provided by oil 152.

Second inlet header 180 may be substantially similar to first inlet header 160. Specifically, in some embodiments such as those shown in FIGS. 3 and 4, second inlet header 180 includes at least one oil inlet port 184 defined therein, to channel oil 152 from the oil supply source into sealed bearing assembly 102 (e.g., into second inlet header 180). In these embodiments, second inlet header 180 includes a second port aperture 186 defined in first surface 182. Second port aperture 186 is in fluid communication with an oil supply aperture substantially similar to oil supply aperture 168. Second inlet header 180 may include a plurality of oil inlet ports 184 and a corresponding plurality of second port apertures 186 arranged circumferentially in second inlet header 180. In addition, in some embodiments, second inlet header 180 includes at least one oil nozzle 190 defined therein. Oil nozzles 190 are in fluid communication with oil inlet port(s) 184. Oil nozzles 190 transmit oil 152 from oil inlet port 184 into cavity 114 (i.e., about bearing element 106). In one particular embodiment, second inlet header 180 is fabricated such that oil nozzles 190 transmit oil 152 into cavity 114 as a fine spray. For example, second inlet header 180 is formed of a sintered material using 3D printing and/or additive manufacturing techniques to include oil inlet port(s) 184 and oil nozzle(s) 190. Accordingly, second inlet header 180 can be formed to apply oil 152 in a controlled manner, in close proximity to those points of bearing element 106 most in need of lubrication and/or cooling. In other embodiments, such as the embodiment illustrated in FIG. 2, second inlet header 180 does not include any oil inlet ports 184, second port apertures 186, nor any oil nozzles 190 defined therein.

In the illustrated embodiment, a plurality of channels 200, also referred to as "scavenge holes," are defined in outer race 104. More particularly, channels 200 are arranged circumferentially about outer race 104 and extend radially through outer race 104. Channels 200 enable outflow of scavenge oil 202 from cavity 114. Specifically, scavenge oil 202 is forced out of cavity 114 by centrifugal forces generated by the rotating components of sealed bearing assembly 102 (i.e., inner race 108, bearing element 106). Outer race 104 includes channel apertures 204 defined in first surface 124 thereof, each channel aperture 204 corresponding to a respective channel 200 and in fluid communication with a respective scavenge line aperture 206 (see FIG. 2) defined in stationary support structure 110. Scavenge line aperture(s) 206 are in fluid communication with a scavenge line 208, which, in the example embodiment, is an annular scavenge line 208 extending circumferentially about stationary support structure 110. In some embodiments, a scavenge pump 210 is coupled to scavenge line 208 to collect scavenge oil 202 from sealed bearing assembly 102. Scavenge pump 210 may additionally facilitate drawing scavenge oil 202 into scavenge line 208 and/or drawing air into sealed bearing assembly 102 through seals thereof (described further herein).

In the example embodiment, bearing element 106 includes a plurality of rolling elements 220, such as ball bearings, arranged circumferentially within cavity 114. In addition, bearing element 106 includes a bearing cage 222 at least partially surrounding rolling elements 220. Bearing cage 222 is configured to cooperate with inner race 108 (specifically concave groove 140 of inner race 108) to ensure rolling elements 220 remain suitably positioned within cavity 114. Bearing cage 222 is arranged adjacent inner race 108. In some embodiments, bearing cage 222 is configured to rotate (i.e., about axis of rotation 36) at a different speed than inner race 108 (coupled to rotatable member 40).

Sealed bearing assembly 102 further includes a first sealing member 230 and a second sealing member 232 that facilitate at least partially sealing cavity 114, such that oil 152 channeled into cavity 114 does not flow into an environment 154 around sealed bearing assembly 102. First sealing member 230 is positioned and extends between first inlet header 160 and inner race 108, and second sealing member 232 is positioned and extends between second inlet header 180 and inner race 108. In the illustrated embodiment, at least a portion of first sealing member 230 extends into a pocket 172 defined in first inlet header 160 and at least a portion of second sealing member 232 extends into a pocket 192 defined in second inlet header 180. In addition, in the illustrated embodiment, each of first and second sealing members 230 and 232 includes a respective biasing element 234 and sealing element 236. More specifically, biasing element 234 biases sealing element 236 against inner race 108 to ensure sealing contact with inner race 108. Biasing element 234 may include, for example, a spring, or any other suitable biasing element 234. Sealing element 236 may include, for example, a ring seal fabricated from a carbon material. It should be understood that sealing element 236 may include additional and/or alternative sealing elements, fabricated from carbon or any other suitable material. In some embodiments, air may be ingested into sealed bearing assembly 102 (i.e., into cavity 114) between first and/or second sealing members 230, 232 and inner race 108. Specifically, suction from scavenge pump 210 may draw air through the seals provided by first and/or second sealing members 230, 232.

In some embodiments, first sealing member 230 extends radially between first inlet header 160 and inner race 108 (see FIGS. 2 and 3). In these embodiments, first sealing member 230 (i.e., the respective sealing element 236 thereof) sealingly couples against third surface 146 defined by first axial arm 142. In addition, pocket 172 is defined in a second surface 174 of first inlet header 160 opposite first surface 162 of first inlet header 160. Similarly, in some embodiments, second sealing member 232 extends radially between second inlet header 180 and inner race 108. In these embodiments, second sealing member 232 sealingly couples against third surface 146 defined by second axial arm 144. In addition, pocket 192 is defined in a second surface 194 of second inlet header 180 opposite first surface 182 of second inlet header 180.

In other embodiments, first sealing member 230 extends axially between first inlet header 160 and inner race 108 (see FIG. 4). In these embodiments, first sealing member 230 sealingly couples against first end surface 148 defined by first axial end 132 of inner race 108. In addition, pocket 172 is defined in a third surface 176 of first inlet header 160 extending between first surface 162 and second surface 174 of first inlet header 160. Similarly, in some embodiments, second sealing member 232 extends axially between second inlet header 180 and inner race 108. In these embodiments, second sealing member 232 sealingly couples against second end surface 150 defined by second axial end 134 of inner race 108. In addition, pocket 192 is defined in a third surface 196 of second inlet header 180 extending between first surface 182 and second surface 194 of second inlet header 180.

Figure 5:
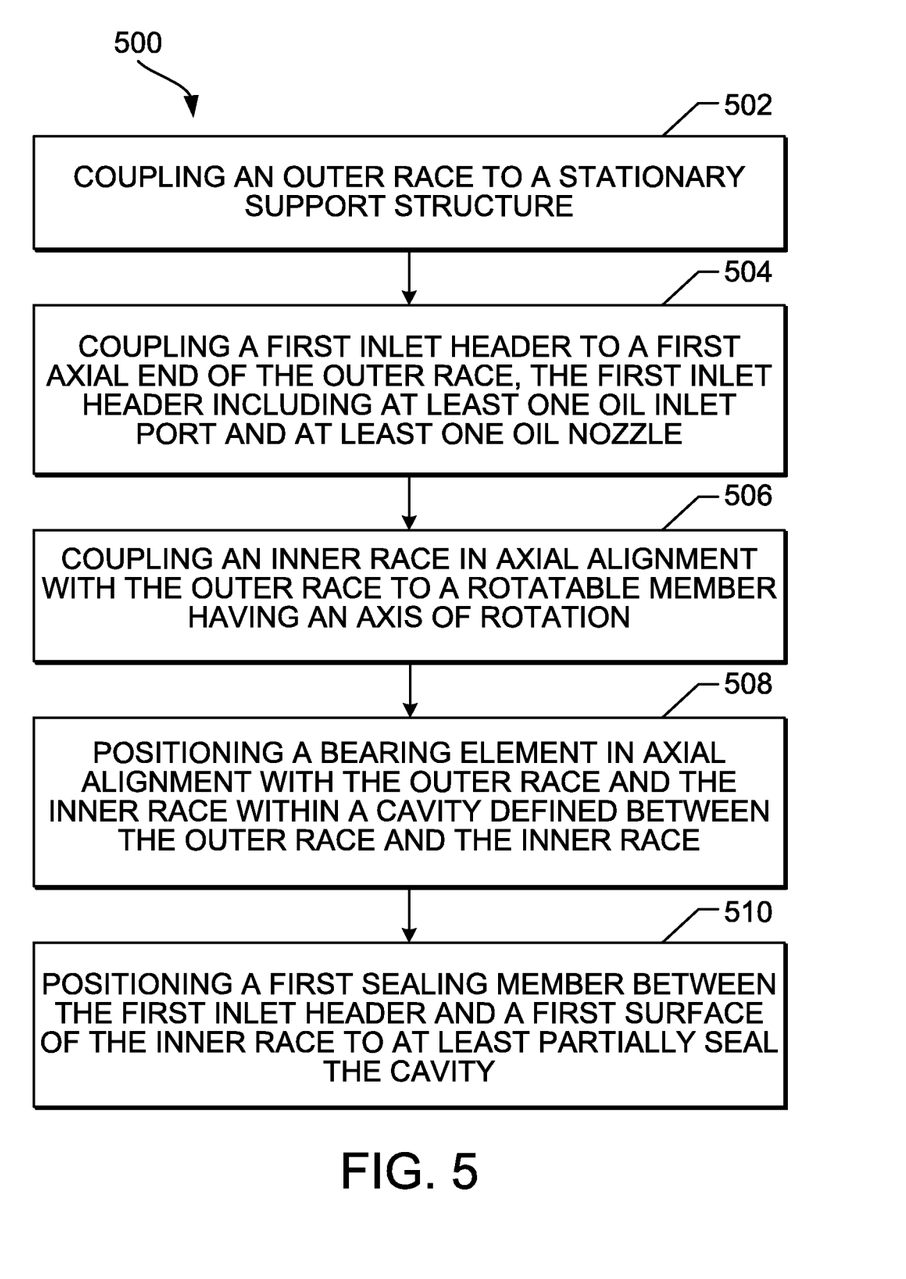
FIG. 5 is a block diagram illustrating a method of forming a sealed bearing assembly as shown in any of FIGS. 2-4.

FIG. 5 is a block diagram illustrating a method 500 of forming a sealed bearing assembly (e.g., sealed bearing assembly 102, shown in FIGS. 2-4). Method 500 includes coupling 502 an outer race (e.g., outer race 104) to a stationary support structure (e.g., stationary support structure 110). Method 500 also includes coupling 504 a first inlet header (e.g., first inlet header 160) to a first axial end (e.g., first axial end 120) of the outer race, the first inlet header including at least one oil inlet port (e.g., oil inlet port 164) and at least one oil nozzle (e.g., oil nozzle 170). Method 500 further includes coupling 506 an inner race (e.g., inner race 108) in axial alignment with the outer race to a rotatable member (e.g., rotatable member 112) having an axis of rotation (e.g., axis of rotation 36, shown in FIG. 1).

Method 500 also includes positioning 508 a bearing element (e.g., bearing element 106) in axial alignment with the outer race and the inner race within a cavity (e.g., cavity 114) defined between the outer race and the inner race, and positioning 510 a first sealing member (e.g., first sealing member 230) between the first inlet header and a first surface (e.g., third surface 146 or first end surface 148) of the inner race to at least partially seal the cavity.

Figure 6:
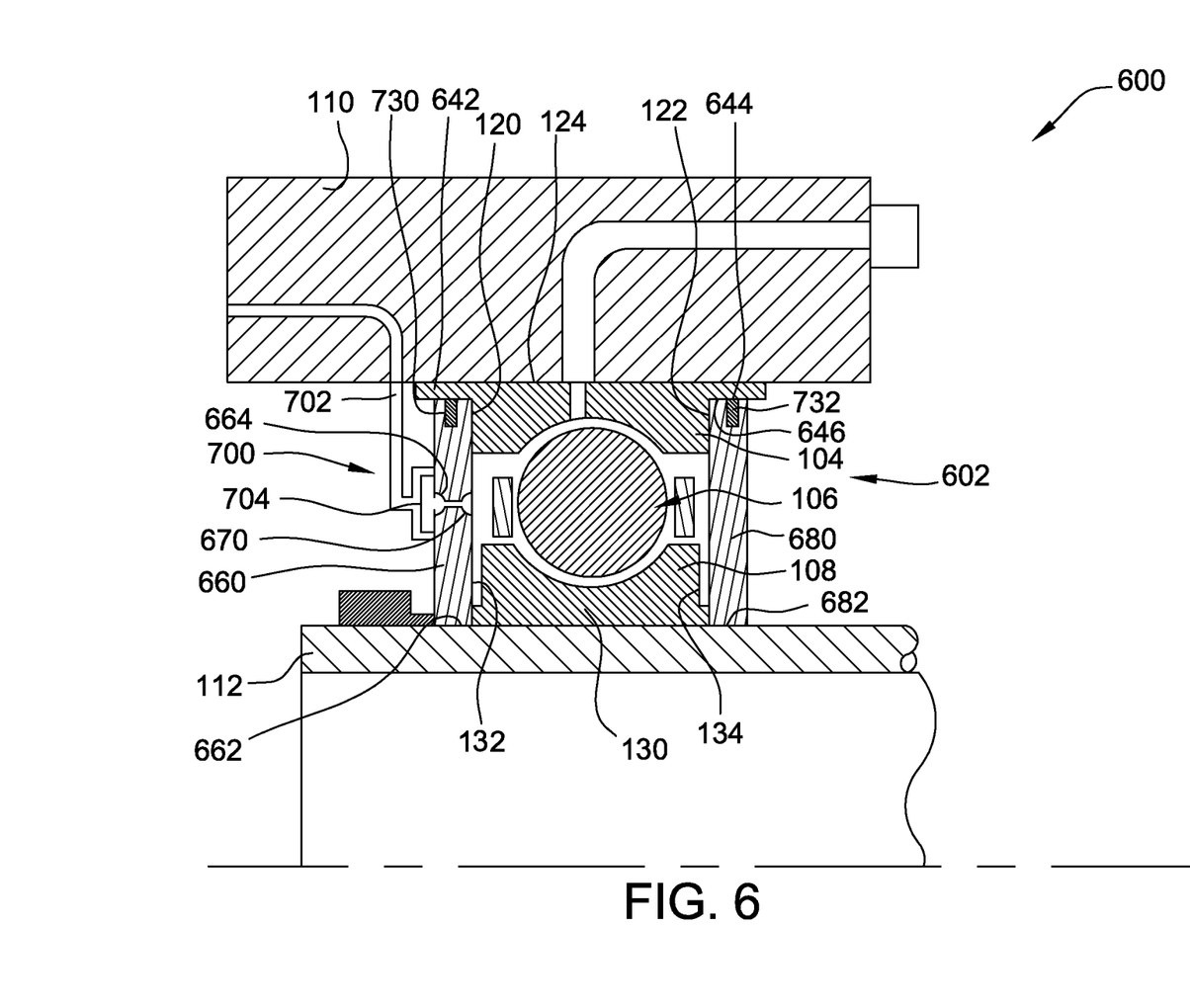
FIG. 6 is a cross-sectional view of another exemplary bearing assembly embodied as a sealed bearing assembly that may be used with the turbine engine shown in FIG. 1.

FIG. 6 is a cross-sectional view of another exemplary bearing assembly 600 embodied as a sealed bearing assembly 602 that may be used with turbine engine 15 (shown in FIG. 1). Sealed bearing assembly 602 may be similar in certain aspects to sealed bearing assembly 102 (shown in FIGS. 2-4), and, accordingly, like numerals are used to reference like elements. Sealed bearing assembly 602 includes outer race 104, bearing element 106, and inner race 108 extending radially in axial alignment between stationary support structure 110 and rotatable member 112. Bearing element 106 is positioned within cavity 114 between outer race 104 and inner race 108.

Outer race 104 includes first axial end 120 and second axial end 122. Outer race 104 is coupled to stationary support structure 110 along a first surface 124 of outer race 104 that extends between first axial end 120 and second axial end 122. In the illustrated embodiment, outer race 104 further includes first and second axial arms 642, 644 extending respectively from first axial end 120 and second axial end 122. First and second axial arms 642, 644 define a third surface 646 of outer race 104. In other embodiments, outer race 104 does not include axial arms 642, 644. Inner race 108 includes body 130 that defines first axial end 132 and second axial end 134 of inner race 108.

A first inlet header 660 is coupled to first axial end 132 of inner race 108, and a second inlet header 680 is coupled to second axial end 134 of inner race 108. First inlet header 660 and second inlet header 680 are further coupled to rotatable member 112, for example, along a first surface 662 of first inlet header 660 and a first surface 682 of second inlet header 680. In the example embodiment, first inlet header 660 is substantially similar to first inlet header 160 (shown in FIGS. 2-4) and includes at least one oil inlet port 664 (similar to oil inlet ports 164) and at least one oil nozzle 670 (similar to oil nozzles 170) defined therein. However, in the illustrated embodiment, oil inlet port 664 is in fluid communication with a fluid coupler 700. Fluid coupler 700 facilitates transmission of fluid (e.g., oil 152, shown in FIG. 2) from the stationary side of sealed bearing assembly 602 (i.e., stationary support structure 110) to the rotating side of sealed bearing assembly 602 (i.e., rotatable member 112). Fluid coupler 700 includes a stationary line 702 extending radially inwardly from stationary support structure 110, and a rotating coupling interface 704 coupled to first inlet header 660. Rotating coupling interface 704 is in fluid communication with stationary line 702 and facilitates channeling fluid from stationary line 702 into first inlet header 660. Second inlet header 680 may be substantially similar to first inlet header 660.

Sealed bearing assembly 602 further includes a first sealing member 730 and a second sealing member 732 that facilitate at least partially sealing cavity 114, such that oil 152 channeled into cavity 114 does not flow into an environment 154 around sealed bearing assembly 602. First sealing member 730 may be substantially similar to first sealing member 230 (shown in FIGS. 3 and 4), and second sealing member 732 may be substantially similar to second sealing member 232 (also shown in FIGS. 3 and 4). For example, each of first and second sealing members 730 and 732 includes a respective biasing element 234 and sealing element 236 (both shown in FIGS. 3 and 4). However, in the embodiment of FIG. 6, first sealing member 730 is positioned and extends between first inlet header 660 and outer race 108, and second sealing member 732 is positioned and extends between second inlet header 680 and outer race 104. More specifically, biasing element 734 biases sealing element 736 against outer race 104 to ensure sealing contact with outer race 104.

In the illustrated embodiment, first sealing member 730 extends radially between first inlet header 760 and outer race 104. First sealing member 730 (i.e., the respective sealing element thereof) sealingly couples against third surface 646 defined by first axial arm 642. Similarly, in some embodiments, second sealing member 732 extends radially between second inlet header 680 and outer race 104. In these embodiments, second sealing member 732 sealingly couples against third surface 646 defined by second axial arm 644.

In alternative embodiments, first sealing member 730 extends axially between first inlet header 660 and outer race 104. In these embodiments, first sealing member 730 sealingly couples against first axial end 120 of outer race 104. Similarly, in some embodiments, second sealing member 732 extends axially between second inlet header 680 and outer race 104. In these embodiments, second sealing member 732 sealingly couples against second axial end 122 of outer race 104.

The sealed bearing assembly described herein facilitates reducing an overall size of a machine lubrication system, while reducing oil and air consumption thereby. Accordingly, by providing a sealing member between inlet headers and an inner race, turbine engine weight and operating costs may be reduced.

Sealed bearing assemblies of the type described herein may be useful in other installations besides gas turbine engines. For example, such sealed bearing assemblies may be utilized in the automotive field or any other field where it is desired to seal oil within a bearing cavity. The technology described herein may be applicable to any rotating machinery application where high load events may be of concern. Although initially envisioned and developed for rotating machinery, there may be potential for use on static machinery as well.

Exemplary embodiments of a sealed bearing assembly, such as for use with a turbine engine, and related components and methods are described above in detail. The assembly and methods are not limited to the specific embodiments described herein, but rather, components of systems and/or steps of the methods may be utilized independently and separately from other components and/or steps described herein. For example, the configuration of components described herein may also be used in combination with other processes, and is not limited to practice with a turbine engine. Rather, the exemplary embodiment can be implemented and utilized in connection with many applications where providing sealed oil cavities within a bearing environment is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sealed bearing assembly comprising:
   an inner race, a bearing element, and an outer race extending radially in axial alignment between a rotatable member having an axis of rotation and a stationary support structure; and
   a first inlet header coupled to a first axial end of said outer race and comprising at least one oil inlet port, at least one oil nozzle, and a first sealing member extending radially between said first inlet header and a first surface of said inner race.

2. The sealed bearing assembly of claim 1 further comprising a second inlet header coupled to a second axial end of said outer race and comprising a second sealing member extending between said second inlet header and a second surface of said inner race.

3. The sealed bearing assembly of claim 2, wherein said second sealing member extends radially between said second inlet header and said second surface of said inner race.

4. The sealed bearing assembly of claim 3, wherein said second inlet header comprises at least one oil inlet port and at least one oil nozzle.

5. The sealed bearing assembly of claim 3, wherein said bearing element comprises a plurality of rolling elements and a bearing cage at least partially surrounding said plurality of rolling elements.

6. The sealed bearing assembly of claim 2, wherein said second inlet header comprises at least one oil inlet port and at least one oil nozzle.

7. The sealed bearing assembly of claim 2, wherein said second sealing member comprises a carbon material.

8. The sealed bearing assembly of claim 1, wherein said bearing element comprises a plurality of rolling elements and a bearing cage at least partially surrounding said plurality of rolling elements.

9. The sealed bearing assembly of claim 1, wherein said first sealing member comprises a carbon material.

10. The sealed bearing assembly of claim 1, wherein at least one of said inner race, said outer race, and said first inlet header is formed of a sintered material.

11. The sealed bearing assembly of claim 1, wherein the first inlet header is formed of a sintered material using 3D printing or additive manufacturing techniques, and the at least one oil nozzle is configured to transmit oil as a spray.

12. A method of forming a sealed bearing assembly, said method comprising:
    coupling an outer race to a stationary support structure;
    coupling a first inlet header to a first axial end of the outer race, the first inlet header including at least one oil inlet port and at least one oil nozzle;
    coupling an inner race in axial alignment with the outer race to a rotatable member having an axis of rotation;
    positioning a bearing element in axial alignment with the outer race and the inner race within a cavity defined between the outer race and the inner race; and
    positioning a first sealing member between the first inlet header and a first surface of the inner race to at least partially seal the cavity;
    wherein positioning the first sealing member between the first inlet header and the first surface of the inner race comprises positioning the first sealing member such that the first sealing member extends radially between the first inlet header and the first surface of the inner race.

13. The method of claim 12, further comprising:
    coupling a second inlet header to a second axial end of the outer race; and
    positioning a second sealing member between the second inlet header and a second surface of the inner race to at least partially seal the cavity.

14. The method of claim 13, further comprising forming at least one of the first inlet header and the second inlet header using additive manufacturing.

15. A machine comprising:
    a rotatable member having an axis of rotation;
    a stationary member radially spaced from said rotatable member; and
    a sealed bearing assembly positioned between said rotatable member and said stationary member to rotatably support said rotatable member in said machine, said sealed bearing assembly comprising:
        an inner race, a bearing element, and an outer race extending radially in axial alignment between said rotatable member and said stationary member; and
        a first inlet header coupled to a first axial end of said outer race and comprising at least one oil inlet port, at least one oil nozzle, and a first sealing member extending radially between said first inlet header and a first surface of said inner race.

16. The machine of claim 15, wherein said sealed bearing assembly further comprises a second inlet header coupled to a second axial end of said outer race, said second inlet header comprising a second sealing member extending between said second inlet header and a second surface of said inner race.

17. The machine of claim 16, wherein said bearing element comprises a plurality of rolling elements and a bearing cage at least partially surrounding said plurality of rolling elements.

18. The machine of claim 15, wherein said bearing element comprises a plurality of rolling elements and a bearing cage at least partially surrounding said plurality of rolling elements.

19. The machine of claim 15, wherein at least one of said inner race, said outer race, and said first inlet header is formed of a sintered material.

20. The machine of claim 15, wherein the first inlet header is formed of a sintered material using 3D printing or additive manufacturing techniques, and the at least one oil nozzle is configured to transmit oil as a spray.

* * * * *